United States Patent [19]

Williigman et al.

[11] Patent Number: 4,467,664

[45] Date of Patent: Aug. 28, 1984

[54] TIMER DRIVE MECHANISM

[75] Inventors: John Williigman, Elk Grove Village; Guy A. Wojtanek, Schiller Park, both of Ill.

[73] Assignee: The Singer Company, Stamford, Conn.

[21] Appl. No.: 306,208

[22] Filed: Sep. 28, 1981

[51] Int. Cl.$^{3}$ ............................................ F16H 29/00

[52] U.S. Cl. .................................. 74/116; 74/568 T; 200/38 B; 200/38 C

[58] Field of Search ............ 74/116, 122, 125, 568 T, 74/118, 112, 113; 200/38 B, 38 BA, 38 C, 38 CA, 38 R

[56] References Cited

U.S. PATENT DOCUMENTS

| | | | |
|---|---|---|---|
| 320,145 | 6/1985 | Lamson | 74/116 |
| 3,724,248 | 4/1973 | Obermann | 74/122 |
| 3,738,185 | 6/1973 | Wooley | 74/116 |
| 3,857,293 | 12/1974 | Godwin et al. | 74/125 |
| 3,871,238 | 3/1975 | Kitai | 74/112 |
| 3,882,734 | 5/1975 | Obermann et al. | 74/337.5 |
| 4,179,945 | 12/1979 | Obermann | 74/122 |
| 4,228,690 | 10/1980 | Ring | 74/568 T |
| 4,319,101 | 3/1982 | Bolin | 74/116 |

FOREIGN PATENT DOCUMENTS

| | | | |
|---|---|---|---|
| 2040464 | 9/1979 | Fed. Rep. of Germany | 74/125 |

*Primary Examiner*—Alexander Grosz
*Assistant Examiner*—Anthony W. Raskob, Jr.
*Attorney, Agent, or Firm*—David L. Davis; Robert E. Smith; Edward L. Bell

[57] ABSTRACT

The timing cam is advanced for switching purposes by the large reciprocating pawl acting on the ratchet teeth molded on the timing cam. When the program requires a timed period during which conditions remain the same the ratchet teeth are spaced so the pawl cannot pick up the next tooth until the cam is advanced by the small pawl acting on the separate ratchet provided with small, closely spaced teeth. This ratchet has a pinion gear driving the ring gear molded inside the timing cam. The steps imparted to the timing cam by the small pawl and ratchet are very small and consume appreciable time—the length of time taken to position the next tooth for engagement by the large pawl being determined by the space between the large teeth.

9 Claims, 5 Drawing Figures

TIMER DRIVE MECHANISM

TECHNICAL FIELD OF THE INVENTION

This invention relates to program timers having a switch operating cam driven at different speeds by a single constant speed motor.

BACKGROUND OF THE INVENTION

Appliance manufacturers have increased the number of programs they wish to provide for their machines such as clothes washers and dishwashers. This places severe demands on the timer designer due to the fact only 360° rotation of the timing (program) cam is available without repeating and there is a practical minimum speed and minimum angular travel for effective switching. Therefore, these minimums determine the basic requirements for the timing cam. Thus, if 6° are required for proper switching, only 60 steps are available and some of these represent start or stop positions so the actual number is appreciably reduced. The switching should be caused by relatively fast movement of the cam which indicates an impulse drive or an eccentric drive.

In most timer programs there are a number of steps used simply to mark time . . . , i.e. provide time for some function. This suggests the desirability of reducing the speed of the program cam while no switching is required so more steps are available for switching. The prior art has addressed the problem of providing for two speeds of the timing cam—a fast speed for switching and a slow speed for marking time.

U.S. Pat. No. 3,882,734 shows a two-speed drive in which the gear train must be externally shifted to change speed. This requires many gears, clutches, ratchet devices, levers, and springs which add to parts cost and manufacturing cost. Only one speed is available at one time. The design is expensive and limited in use.

U.S. Pat. No. 3,857,293 provides two drive pawls each acting on its own ratchet on the periphery of the timing cam. One pawl moves only a short distance and engages a ratchet in which the teeth are small and closely spaced. The other pawl moves a longer distance and engages large teeth on the other ratchet. A stop (anti-reverse) pawl engages the finer teeth. The number of small teeth must be a multiple of the large teeth and the pawls must be operated synchronously to keep the switching synchronized, the idea being that if there is a large tooth missing, the pawl operating on the small teeth will have to advance the cam the number of small steps (teeth) necessary to equal a large tooth and bring a large tooth into range of the large pawl. This arrangement requires many parts and gears to get the necessary different operating speed and travel of the two pawls. This design is limited by its need for a large tooth to be some multiple of the small teeth and there is a practical limit imposed on the ratio of high speed to low speed given the fact that use of large angular travel is self-defeating (by using up too much of the available angular travel) and the small teeth get too small as the ratio increases.

SUMMARY OF THE INVENTION

The object of this invention is to provide a program timer having a single constant speed motor driving the timing cam at two or more speeds through a drive system which can impulse or drive the timing cam at normal speed and increments or can impulse the cam at very small increments through a pawl and ratchet separate from the cam but driving the cam through gears. With this arrangement there is no need to synchronize the two drives and a higher ratio of high speed to low speed can be attained with ease. The slow speed can be made even slower at selected portions of the program by use of a masking ratchet. Since there is no need for a specific ratio between normal impulses and slow impulses variable normal steps can be employed to further enhance the timer capability. Switching can be effected by the slow speed drive to add even more functions to the timer.

DETAILED DESCRIPTION OF THE DRAWINGS

Figure 1:
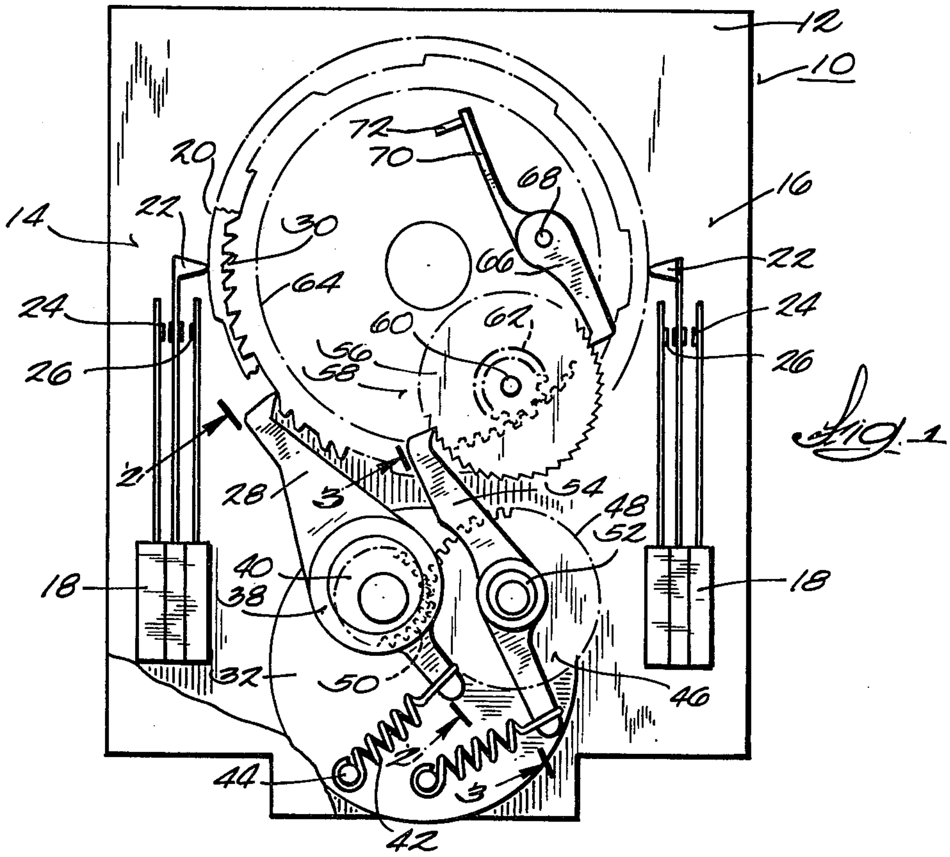
FIG. 1 is a somewhat schematic plan view of a timer provided with the novel drive.
Figure 2:
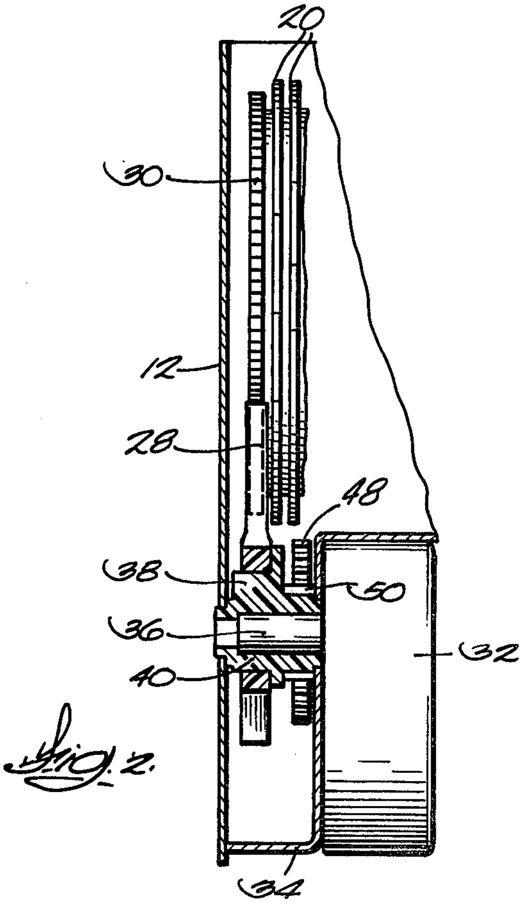
FIG. 2 is a cross-section on line 2—2 in FIG. 1.
Figure 3:
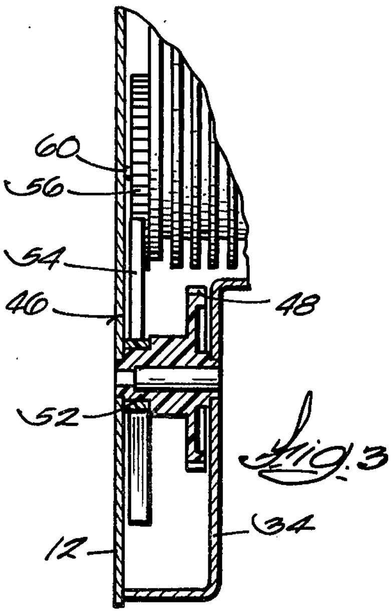
FIG. 3 is a cross-section on line 3—3 in FIG. 1.

Timing cam 10 is journaled between plate 12 and a spaced parallel plate not shown. A multiplicity of switches 14, 16 are mounted in support blocks 18 which are supported between the plates. Each switch is associated with one of the cam tracks 20 so the center blade provided with a follower 22 will be actuated by the cam tracks to close on the upper blade contact 24 or the lower blade contact 26 or to make no circuit. In order to obtain proper switching action the timing cam should be moving fast (impulsed) during actuation. This factor plus the fact certain switches must be actuated in a given sequence dictates that the average step should be about 6°.

The timing cam can be impulsed at switching speed by the normal or drive pawl 28 acting on the teeth of ratchet 30 molded on the end of the timing cam. The pawl 28 is driven by motor 32 mounted on bracket 34 between the plates. As customary the motor includes reduction gearing and has a drive shaft 36 on which a molded eccentric/gear member 38 is fixed with its outboard end journaled in plate 12. The eccentric 40 rotatably fits in the circular opening of the pawl 28. Spring 42 tensioned between the tail of the pawl 28 and anchor 44 on the plate 12 biases the pawl 28 into engagement with the ratchet 30. Therefore, as the eccentric 40 rotates the pawl 28 is reciprocated a distance equal to twice the eccentricity. Assuming closely spaced ratchet teeth the pawl 28 will be able to pick up a tooth on the back stroke of the pawl. If the teeth are spaced more than the stroke, the pawl 28 cannot pick up a tooth to advance the timer. This feature is used to make the normal drive inoperative when more time is desired between the advance via the drive pawl.

It will be understood the cam tracks and ratchet teeth are arranged so that switching occurs during normal advance of the timing cam. When there is to be a time delay between switching operations it is not desirable to use up available angular motion of the timing cam at 6° steps. Therefore, the ratchet teeth 30 are spaced so the normal drive cannot advance the timing cam. It is at this time the slow advance of the timing cam comes into play.

The slow advance includes the eccentric/gear member 46 journaled between plate 12 and bracket 34. The gear 48 is driven by pinion 50. This gives a gear reduction so eccentric 52 rotates slower than eccentric 40. A second pawl 54 is journaled on and reciprocated by the eccentric 52. The stroke of this pawl 54 is short but long enough to always pick up a tooth of ratchet 56 of ratchet/pinion member 58 journaled on stub shaft 60 fixed in plate 12. The pinion 62 of ratchet/pinion member 58 drives ring gear 64 molded on the inside of the timing cam. The gear ratio gives a reduction. It will now be apparent that the second pawl 54 is stroked less often than the drive pawl 28 (due to the reduction from pinion 50 to gear 48) and the second pawl 54 advances the second ratchet 56 only a few degrees per stroke. Then, due to the reduction from gear 62 to ring gear 64, the ratchet rotation is imparted to the timing cam at further substantial reduction. Therefore, the second pawl advances the timing cam very slowly indeed. The length of time required to reach the next tooth on the cam ratchet 30 is a function of the space between the teeth. This "blank" space can be at the root or tip diameter of the ratchet teeth—it makes no difference.

Since both drives are interconnected through the gear/ring gearing a single anti-reverse pawl 66 acting on the second ratchet 56 is effective during normal (switching) advance or slow advance. Pawl 66 is mounted on stub shaft 68 having a spring tail 70 bearing against port 72 to bias the pawl 66 into the ratchet 56 at all times while allowing the ratchet 56 to advance. When the timing cam is advanced by the normal (switching) drive (or advanced manually) the gearing between the cam and the second ratchet will cause the second ratchet to rotate rapidly under both the anti-reverse pawl and the second pawl.

There is no need to fix the number of slow steps to the normal step in this design. Therefore, great design flexibility is inherent and the ratio of (high) normal speed advance to slow speed advance can be very high indeed. This lets the designer maximize the switching functions while requiring only a few degrees of cam rotation for the timed (or mark time or tolling) slow advance. This makes possible on-off functions previously not attained in timers of this type—i.e., the on-off can be completed in a short time interval without requiring separated cams and switches (such as subinterval switches). If subinterval switching is desired, it can be provided in conjunction with either eccentric. In some cases it may be desirable to provide two slow speeds. This can be done with the masking technique whereby a mask would prevent normal actuation of the second ratchet until the second pawl has stepped the mask out of the way. That would give a time delay. The mask could be manually positioned or could be controlled by a cam track on the timing cam.

Since there is no fixed ratio requirement as to number of short steps to long steps it is possible tu use the very desirable variable step feature of U.S. Pat. No. 4,179,945 to maximize switching performance and precision.

Figure 4:
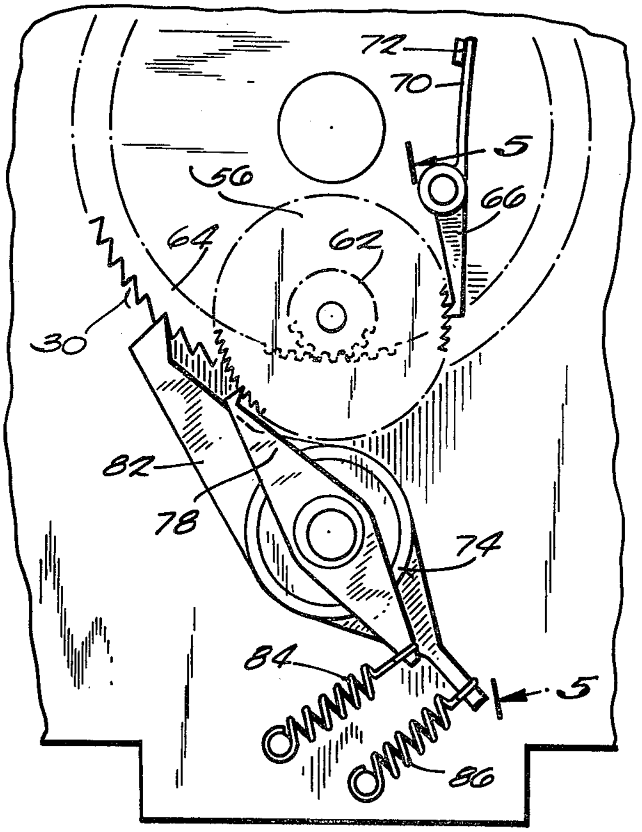
FIG. 4 is similar to FIG. 1 but shows a modified drive in which both pawls are operated by the same rotating member which is provided with two eccentrics.
Figure 5:
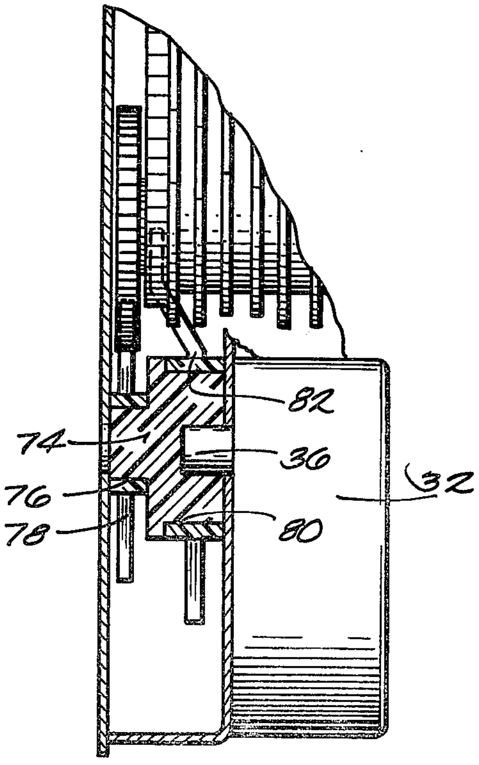
FIG. 5 is a cross-section on line 5—5 in FIG. 4.

The modification shown in FIGS. 4 and 5 is less expensive but loses some design flexability. In some cases it is an attractive trade-off. In this design both eccentrics are mounted on and rotate with the output of motor 32. Thus the molded part 74 is fixed on the shaft 36 and has small eccentric 76 journaling the hub of second pawl 78 while large eccentric 80 journals the hub of drive pawl 82. Pawls 78, 82 are biased by springs 84, 86 respectively into engagement with the second ratchet 56 and the timing cam ratchet 30, respectively. Operation is as before with the pinion 62 carried by ratchet 56 engaging ring gear 64. In this design the pawls stroke in unison (or at a fixed relation) which has no particular advantage. The elimination of the gear reduction between the two pawl drives reduces the possible magnitude of high to low speed ratio. There is one less part and the gear/pinion parts of the molded parts (eccentrics) of FIG. 1 are eliminated. The design flexibility afforded by the gear drive from the second ratchet to the timing cam is retained. With either modification the time bases can be changed easily by changing the size of the teeth in either ratchet and the pawl stroke (eccentricity) and changing the gear reduction between the second ratchet and the timing cam. In some cases it may be desirable to have no reduction or to have step up gearing in the drive to the second pawl.

We claim:

1. In a programmed switching device having a rotatable cam member provided with a plurality of cam tracks operating switches in sequence, the cam member including a drive ratchet engaged by a drive pawl, a motor, and drive means connecting the motor to the drive pawl and reciprocating the drive pawl a finite distance, the improvement comprising, a second pawl driven and reciprocated by said motor, a second ratchet engaged by said second pawl, a first gear on said cam member, a second gear on said second ratchet, said first and second gears drivingly connected some of the drive ratchet teeth being spaced more than said finite distance whereby the drive pawl is unable to advance the drive ratchet until the next tooth has been advanced to a position in which it can be engaged by the drive pawl, the second pawl and second ratchet being operative to advance the cam member to said position in which the drive pawl can engage the next tooth on the drive ratchet to advance the cam member.

2. A device according to claim 1 in which the second pawl is reciprocated only a short stroke and the teeth on the second ratchet are closely spaced whereby the second ratchet is rotated only a few degrees for each stroke of the second pawl, said gearing providing a reduction so the cam member is rotated fewer degrees than the second ratchet.

3. A device according to claim 2 in which the motor drives the second pawl through gearing.

4. A device according to claim 2 or 3 including an anti-reverse pawl engaging the second ratchet.

5. A program timer comprising, a rotatable timing cam having a plurality of cam tracks, switches operated by said cam tracks, a ratchet on timing cam, a drive pawl biased into engagement with the cam ratchet, a motor, first means driven by the motor and operative to reciprocate the drive pawl a finite distance, some of the teeth on the cam ratchet being spaced more than said finite distance whereby the drive pawl is unable to advance the timing cam until it has been advanced by other means to bring a tooth on the cam ratchet into a position in which it can be engaged by said drive pawl, said other means comprising a second ratchet and a first gear on said second ratchet, a second gear on the timing cam drivingly connected to said first gear, the second ratchet being driven by a second pawl, said second pawl being driven by said motor through second means imparting a reciprocating motion to the second pawl.

6. A timer according to claim 5 in which the cam tracks and cam ratchet teeth are designed to operate said switches as the timing cam is rotated by the drive pawl and the timing cam is rotated by the second pawl and second ratchet when longer time intervals between switching functions are desired.

7. A timer according to claim 6 in which the second ratchet is drivingly connected to the timing cam through reduction gearing.

8. A timer according to claim 7 in which said first means drives the second means through gearing.

9. A timer according to claim 7 in which the first and second means are mounted on a common axis.

* * * * *